(12) United States Patent
Ware et al.

(10) Patent No.: US 10,817,419 B2
(45) Date of Patent: *Oct. 27, 2020

(54) MEMORY CONTROLLER SUPPORTING NONVOLATILE PHYSICAL MEMORY

(71) Applicant: Rambus Inc., Sunnyvale, CA (US)

(72) Inventors: Frederick A. Ware, Los Altos Hills, CA (US); Ely K. Tsern, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,749

(22) Filed: Jan. 11, 2019

(65) Prior Publication Data
US 2019/0220399 A1 Jul. 18, 2019

Related U.S. Application Data

(63) Continuation of application No. 15/050,246, filed on Feb. 22, 2016, now Pat. No. 10,210,080, which is a
(Continued)

(51) Int. Cl.
*G06F 12/00* (2006.01)
*G06F 13/00* (2006.01)
(Continued)

(52) U.S. Cl.
CPC ...... *G06F 12/0253* (2013.01); *G06F 12/0246* (2013.01); *G06F 12/08* (2013.01);
(Continued)

(58) Field of Classification Search
CPC .. G06F 12/0246; G06F 12/0253; G06F 12/08; G06F 12/0802; G06F 12/0804;
(Continued)

(56) References Cited

U.S. PATENT DOCUMENTS

| 5,045,996 A | 9/1991 | Barth et al. |
| 5,359,569 A | 10/1994 | Fujita et al. |

(Continued)

FOREIGN PATENT DOCUMENTS

| EP | 0619541 | 10/1994 |
| EP | 1667014 | 6/2006 |

(Continued)

OTHER PUBLICATIONS

"4 MEG x 16 Syncflash Memory MT28S4M16LC 1Meg x 16 x 4 banks," MT2854M16LC_4.p65, Rev 4, Micron Technology, Inc., May 2001. 48 pages.

(Continued)

*Primary Examiner* — Sheng Jen Tsai
(74) *Attorney, Agent, or Firm* — Silicon Edge Law Group LLP; Arthur J. Behiel (57) ABSTRACT

A memory system includes nonvolatile physical memory, such as flash memory, that exhibits a wear mechanism asymmetrically associated with write operations. A relatively small cache of volatile memory reduces the number of writes, and wear-leveling memory access methods distribute writes evenly over the nonvolatile memory.

20 Claims, 6 Drawing Sheets

Related U.S. Application Data continuation of application No. 14/280,437, filed on May 16, 2014, now Pat. No. 9,298,609, which is a continuation of application No. 12/513,848, filed as application No. PCT/US2007/023432 on Nov. 6, 2007, now Pat. No. 8,745,315.

(60) Provisional application No. 60/857,408, filed on Nov. 6, 2006.

(51) Int. Cl.
| | |
|---|---|
| *G06F 12/02* | (2006.01) |
| *G06F 12/0804* | (2016.01) |
| *G06F 12/08* | (2016.01) |
| *G06F 12/0802* | (2016.01) |
| *G06F 12/0891* | (2016.01) |
| *G06F 12/1009* | (2016.01) |

(52) U.S. Cl.
CPC ...... *G06F 12/0802* (2013.01); *G06F 12/0804* (2013.01); *G06F 12/0891* (2013.01); *G06F 12/1009* (2013.01); *G06F 2212/1036* (2013.01); *G06F 2212/2022* (2013.01); *G06F 2212/60* (2013.01); *G06F 2212/7201* (2013.01); *G06F 2212/7205* (2013.01); *G06F 2212/7211* (2013.01)

(58) Field of Classification Search
CPC ............. G06F 12/0891; G06F 12/1009; G06F 2212/1036; G06F 2212/2022; G06F 2212/60; G06F 2212/7201; G06F 2212/7205; G06F 2212/7211
USPC ........................................................ 711/114
See application file for complete search history.

(56) References Cited

U.S. PATENT DOCUMENTS

| | | | | |
|---|---|---|---|---|
| 5,535,399 | A * | 7/1996 | Blitz ..................... | G06F 3/0601 711/104 |
| 5,590,189 | A * | 12/1996 | Turnbull ................ | H04M 1/247 379/142.06 |
| 5,745,728 | A * | 4/1998 | Genduso ............. | G06F 9/30018 711/126 |
| 5,905,842 | A * | 5/1999 | Kajimoto ............. | G11B 27/034 386/241 |
| 6,038,636 | A * | 3/2000 | Brown, III .......... | G06F 12/0246 711/103 |
| 6,088,767 | A | 7/2000 | Dan et al. | |
| 6,119,205 | A * | 9/2000 | Wicki .................. | G06F 12/0804 711/122 |
| 6,170,047 | B1 | 1/2001 | Dye | |
| 6,178,132 | B1 | 1/2001 | Chen et al. | |
| 6,219,763 | B1 | 4/2001 | Lentz et al. | |
| 6,260,127 | B1 | 7/2001 | Olarig et al. | |
| 6,397,292 | B1 | 5/2002 | Venkatesh et al. | |
| 6,421,279 | B1 | 7/2002 | Tobita et al. | |
| 6,477,616 | B1 | 11/2002 | Takahashi | |
| 6,567,902 | B1 * | 5/2003 | Padmanabhan ..... | G06F 9/30032 711/156 |
| 6,578,127 | B1 | 6/2003 | Sinclair | |
| 6,633,724 | B1 * | 10/2003 | Hasegawa ................ | G11B 27/11 386/265 |
| 6,720,643 | B1 | 4/2004 | Fox et al. | |
| 6,782,466 | B1 | 8/2004 | Steele et al. | |
| 6,791,877 | B2 * | 9/2004 | Miura ..................... | G11C 5/02 365/185.11 |
| 6,839,823 | B1 | 1/2005 | See et al. | |
| 6,970,887 | B1 * | 11/2005 | Brigham ............. | G06F 16/2358 |
| 7,016,904 | B1 * | 3/2006 | Grove .................. | G06F 16/9027 707/696 |
| 7,051,160 | B2 | 5/2006 | Beckert et al. | |
| 7,082,495 | B2 | 7/2006 | DeWhitt et al. | |
| 7,089,350 | B2 | 8/2006 | Koren et al. | |
| 7,158,167 | B1 * | 1/2007 | Yerazunis .............. | H04N 5/772 348/61 |
| 7,293,009 | B2 | 11/2007 | Jacobs et al. | |
| 7,409,467 | B2 * | 8/2008 | Fujita ...................... | G06F 13/28 710/22 |
| 7,581,078 | B2 | 8/2009 | Ware | |
| 8,086,788 | B2 * | 12/2011 | Randell ............... | G06F 11/1068 711/101 |
| 8,140,739 | B2 | 3/2012 | Langlois et al. | |
| 8,745,315 | B2 * | 6/2014 | Ware .................... | G06F 12/0246 711/103 |
| 9,274,860 | B2 * | 3/2016 | Jung ....................... | G06F 9/544 |
| 9,672,165 | B1 * | 6/2017 | Satish ..................... | G06F 16/27 |
| 2002/0097594 | A1 * | 7/2002 | Bruce .................. | G06F 12/0804 365/189.16 |
| 2002/0099843 | A1 * | 7/2002 | Fruchtman .............. | H04L 29/06 709/232 |
| 2002/0185337 | A1 * | 12/2002 | Miura ...................... | G11C 5/02 185/11 |
| 2003/0070035 | A1 * | 4/2003 | Wang .................... | G06F 9/4401 711/103 |
| 2003/0110343 | A1 | 6/2003 | Hagiwara et al. | |
| 2004/0005145 | A1 * | 1/2004 | Chen ....................... | G11B 20/10 386/268 |
| 2004/0057316 | A1 * | 3/2004 | Kozakai ............... | G06F 11/1068 365/222 |
| 2004/0107315 | A1 * | 6/2004 | Watanabe ............ | G06F 11/1451 711/114 |
| 2004/0123282 | A1 * | 6/2004 | Rao ...................... | G06F 11/1004 717/168 |
| 2004/0133747 | A1 | 7/2004 | Coldewey | |
| 2004/0168017 | A1 | 8/2004 | Hayashi | |
| 2004/0177214 | A1 | 9/2004 | Chiu | |
| 2004/0186946 | A1 * | 9/2004 | Lee ........................ | G06F 3/0616 711/103 |
| 2004/0230738 | A1 * | 11/2004 | Lim ....................... | G06F 9/4403 711/103 |
| 2005/0021912 | A1 * | 1/2005 | Ho ........................ | G06F 12/0862 711/137 |
| 2005/0044332 | A1 * | 2/2005 | de Brebisson ...... | G06F 11/1441 711/162 |
| 2005/0055495 | A1 | 3/2005 | Vihmalo et al. | |
| 2005/0055531 | A1 * | 3/2005 | Asami .................. | G06F 12/0246 711/203 |
| 2005/0071839 | A1 * | 3/2005 | Kim ........................... | G06F 8/65 717/170 |
| 2005/0172067 | A1 | 8/2005 | Sinclair | |
| 2005/0177675 | A1 | 8/2005 | Newman et al. | |
| 2005/0187988 | A1 * | 8/2005 | Fulton .................. | G05B 19/054 |
| 2005/0235131 | A1 * | 10/2005 | Ware .................... | G06F 12/0292 711/203 |
| 2006/0015685 | A1 * | 1/2006 | Daito .................... | G06F 12/0842 711/118 |
| 2006/0059297 | A1 | 3/2006 | Nakanishi et al. | |
| 2006/0072369 | A1 * | 4/2006 | Madter ................ | G06F 12/0804 365/232 |
| 2006/0087893 | A1 * | 4/2006 | Nishihara ............ | G06F 12/0246 365/145 |
| 2006/0095671 | A1 | 5/2006 | Gower et al. | |
| 2006/0095733 | A1 * | 5/2006 | Lee ..................... | G06F 9/30072 712/217 |
| 2006/0106749 | A1 * | 5/2006 | Ganfield ............. | G06F 16/9024 |
| 2006/0106972 | A1 * | 5/2006 | Gorobets ............ | G06F 12/0246 711/103 |
| 2006/0136677 | A1 | 6/2006 | Fuhs et al. | |
| 2006/0149931 | A1 * | 7/2006 | Haitham ............... | G06F 9/3824 712/218 |
| 2006/0253645 | A1 | 11/2006 | Lasser | |
| 2006/0271755 | A1 * | 11/2006 | Miura .................. | G06F 11/1068 711/165 |
| 2007/0005894 | A1 * | 1/2007 | Dodge ................ | G06F 12/0866 711/118 |
| 2007/0028040 | A1 | 2/2007 | Sinclair | |
| 2007/0033330 | A1 * | 2/2007 | Sinclair ................. | G06F 3/0605 711/103 |

(56) References Cited

U.S. PATENT DOCUMENTS

| | | |
|---|---|---|
| 2007/0079065 A1 | 4/2007 | Bonella et al. |
| 2007/0276973 A1* | 11/2007 | Tan .................... G06F 5/14 710/112 |
| 2007/0276996 A1 | 11/2007 | Caulkins et al. |
| 2007/0288683 A1 | 12/2007 | Panabaker et al. |
| 2007/0300008 A1 | 12/2007 | Rogers et al. |
| 2008/0155184 A1* | 6/2008 | Gorobets ............ G06F 3/0613 711/103 |
| 2009/0055680 A1* | 2/2009 | Honda ............. G06F 11/1068 714/5.1 |
| 2009/0168524 A1* | 7/2009 | Golov ................ G11C 16/349 365/185.09 |
| 2010/0005232 A1 | 1/2010 | Randell et al. |
| 2010/0037001 A1 | 2/2010 | Langlois et al. |
| 2010/0095051 A1* | 4/2010 | Chen ................ G06F 12/0246 711/103 |
| 2012/0030403 A1 | 2/2012 | Miura |
| 2012/0144102 A1 | 6/2012 | Langlois et al. |
| 2012/0179857 A1* | 7/2012 | Gera ................ G06F 16/1847 711/103 |
| 2014/0258601 A1* | 9/2014 | Ware ................ G06F 12/0246 711/103 |

FOREIGN PATENT DOCUMENTS

| | | |
|---|---|---|
| GB | 2291991 | 2/1996 |
| WO | WO-1999-030240 A1 | 6/1999 |
| WO | WO-02-23355 | 3/2002 |
| WO | WO-03/21448 | 3/2003 |
| WO | WO-2005-038660 A2 | 4/2005 |
| WO | WO-2008-121559 A1 | 10/2008 |

OTHER PUBLICATIONS

"4Mb Smart 3 Boot Block Flash Memory," F45_2.p65, Rev 2, Micron Technology, Inc., Mar. 2001. 30 pages.

"Intel Turbo Memory," downloaded from http://www.intel.com/design/flash/nand/turbomemory/index.htm on Sep. 3, 2007. 2 pages.

"SyncFlash and DRAM Mail Memory Subsystems in Pentium and Windows Applications," Micron Technology, Inc., Mar. 2002, Slide Show Presentation. 16 pages.

Amendment with RCE dated May 5, 2011 re U.S. Appl. No. 12/513,848. 13 Pages.

Bhattacharya et al., "FET Gate Structure for Nonvolatile N-Channel Read-Mostly Memory Devices," IBM Technical Disclosure Bulletin, US IBM Corp., vol. 18, No. 6, pp. 1768, 1976. 2 pages.

Cash, Kelly, "Flash SSDs—Inferior Technology or Closet Superstar?" Bit Micro Networks, downloaded Jul. 27, 2006. 3 pages.

Information Disclosure Statement dated Oct. 27, 2010, re U.S. Appl. No. 12/513,848. 3 Pages.

Information Disclosure Statement with mail date of Jun. 1, 2010 re U.S. Appl. No. 12/513,848. 2 Pages.

International Preliminary Report on Patentability (Chapter II) dated May 25, 2010 in International Application No. PCT/US07/23432. 14 pages.

Johnson, Bary Alyssa, "Seagate Launches First Hybrid Hard Drive," PCMAG.COM, Jun. 7, 2006. 2 pages.

Lee, J.H., "How to Implement DDR SGRAM in Graphic System," 4Q98 Rev. 0.0, Samsung Electronics, 4th Quarter 1998. 13 pages.

Nvstedt, Dan, "Intel Slashes PC Power-UP Times," Macworld—The MAC Experts, IDG News Service, Oct. 17, 2005. 1 page.

Office Action dated May 27, 2010 re U.S. Appl. No. 12/513,848, includes Notification of References Cited and Information Disclosure Statement. 33 Pages.

PCT Application and Figures as filed on Mar. 19, 2008 with PCT Serial No. PCT/US08/057471. 40 Pages. Applicant's reference No. RA490.F.PCT. (Document shows outside counsel's reference No. RAMB01072WO0).

PCT International Search Report and Written Opinion dated Jul. 2, 2008 in International Application No. PCT/US07/023432. 14 pages.

Response dated Oct. 27, 2010 to the Office Action dated May 27, 2010 re U.S. Appl. No. 12/513,848. 10 Pages.

SanDisk Corporation, "Sandisk Flash Memory Cards Wear Leveling," SanDisk White Paper, Doc. No. 80-36-00278, Oct. 2003. 6 pages.

Schurman, Kyle, "Hard Drive & Flash Memory a Perfect Match," Sources: Microsoft and Samsung, Aug. 2005. 2 pages.

Shimpi, Anand Lal, "Investigating Intel's Turbo Memory: Does it Really Work?" AnandTech, Jun. 19, 2007. 12 pages.

Shmidt, Dmitry, "True FFS Wear-Leveling Mechanism," Technical Note (TN-DOC-017), Rev. 1.1, May 20, 2002. 4 pages.

U.S. Application and Figures as filed on Sep. 10, 2007 with U.S. Appl. No. 11/852,996. 30 Pages. Applicant's Reference No. RA351.C1.US (Document shows outside counsel's reference No. RA351.P.C1.US).

U.S. Application and Figures as filed on Apr. 20, 2004 with U.S. Appl. No. 10/828,900. pp. 31.

U.S. Provisional Application and Figures as filed on Mar. 30, 2007 with U.S. Appl. No. 60/909,359. 38 Pages. Applicant's reference No. RA490.PROV1.US (Document shows outside counsel's reference No. RAMB-01072US0).

Ware, Frederick re U.S. Appl. No. 12/513,848, filed Dec. 1, 2009 re Office Action dated Nov. 9, 2011. 8 Pages.

Ware, Frederick, U.S. Appl. No. 12/513,848, filed Dec. 1, 2009, Office Action dated Feb. 17, 2012. 16 pages.

Ware, Frederick, U.S. Appl. No. 12/513,848, filed Dec. 1, 2009, Information Disclosure Statement submitted on Mar. 25, 2011. 3 Pages.

* cited by examiner

MEMORY CONTROLLER SUPPORTING NONVOLATILE PHYSICAL MEMORY

FIELD

The disclosed embodiments relate generally to memory systems and methods, and in particular to non-homogeneous memory systems and methods.

BACKGROUND

Computer program code and data needed for execution of a process on a computer system typically reside in the computer system's physical memory. Sometimes referred to as "primary storage," "internal memory," or "main memory," physical memory is accessible to the computer's central processing unit (CPU) without the use of the computer's input/output (I/O) channels. Physical memory typically affords very fast access and is therefore frequently used to store information that is or is likely to be in active use by the CPU.

Because physical memory is typically volatile and relatively expensive, many computer systems utilize secondary storage. This secondary storage is usually accessible to the CPU via the computer's I/O channels and is normally used for persistent storage of relatively large amounts of data. Since the physical memory in many computer systems is more limited than what would be required to store all the program code and data that a user may want to access, many computer systems have what is called "virtual memory."

In a computer system with virtual memory, some of the program code and/or data in the physical memory may be removed from physical memory and stored in the secondary storage, such as the computer's hard disk, until space becomes available on the physical memory or until such code or data is needed by the CPU. Because access to the code and data in secondary storage is typically slower access than from physical memory, it is desirable to swap code or data in the physical memory that is unlikely to be used soon by the CPU with code or data in the secondary storage.

Many computer systems employing virtual memory have automatic storage allocation schemes to manage the transfer of code and storage between physical memory and secondary storage. Pages of data and program code are transferred from secondary storage to physical memory as the data and program code is needed by an executing process, and pages of data and program code are evicted from physical memory and written to secondary storage when room is needed in physical memory to store other pages of data and program code. The process of moving pages of data and program code back and forth between physical memory and secondary storage is called by a variety of names, including swapping, paging, and virtual memory management.

The location in the physical memory where a particular piece of data or code is stored is referred to as the physical address. A logical address or virtual address is a memory location accessed by an application program in a system with virtual memory such that intervening computer hardware and/or software maps the virtual address to physical memory. During the course of execution of the application, the same virtual address may be mapped to many different physical addresses as data and programs are paged out and paged in to other locations. The virtual address (which may also be referred to as the logical address) typically includes a virtual (or logical) page number plus the location within that page and is typically interpreted or mapped onto a physical memory address by the operating system using an address translation function. If the page is present in physical memory, the address translation function substitutes the physical page frame number for the logical number. If the address translation function detects that the page requested is not present in physical memory, a fault occurs and the page is read into a physical memory page frame from secondary storage. This address translation function can be accomplished using a directly indexed table, commonly referred to as a "page table," which identifies the location of the program's pages in physical memory. If the page table indicates that a page is not resident in physical memory, the address translation function issues a page fault to the operating system. This causes execution of the program which required the page to be suspended until the desired page can be read from secondary storage and placed in physical memory.

Portable computing devices typically use a single type of memory device at each level in their memory hierarchy. Higher levels in the memory hierarchy typically operate at higher speeds and lower latency than lower levels. For example, portable computers (e.g., notebook computers) typically have three or more hierarchical levels of memory, including cache memory, secondary storage, and physical memory. Cache memory is typically implemented using Static Random-Access Memory (SRAM). Often there are two or more levels of cache memory. Secondary storage is typically implemented with magnetic disk storage (often called hard disk storage). Physical memory is typically implemented with Dynamic Random-Access Memory (DRAM). In some portable computers, such as personal digital assistants (PDAs), the secondary storage is implemented using flash memory instead of magnetic disk storage.

DRAM has a near-optimal combination of operational attributes for implementing physical memory. These attributes include, without limitation, low cost (only magnetic disk storage has a lower per-bit cost), low read time (the read access time is within an order of magnitude of that of the highest speed SRAM), low write time that is the same or similar to the read access time, and essentially unlimited endurance (i.e., the storage cell can be rewritten an unlimited number of times). Unfortunately, DRAM is volatile, which is to say that DRAM cannot maintain stored data in the absence of applied power. This means that computers relying upon DRAM for physical memory must maintain applied power even when not in use—a problem of particular significance for battery-powered devices—or require slow boot processes during which information is moved from secondary memory into physical memory. There is therefore a need for memory systems that include nonvolatile physical memory.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
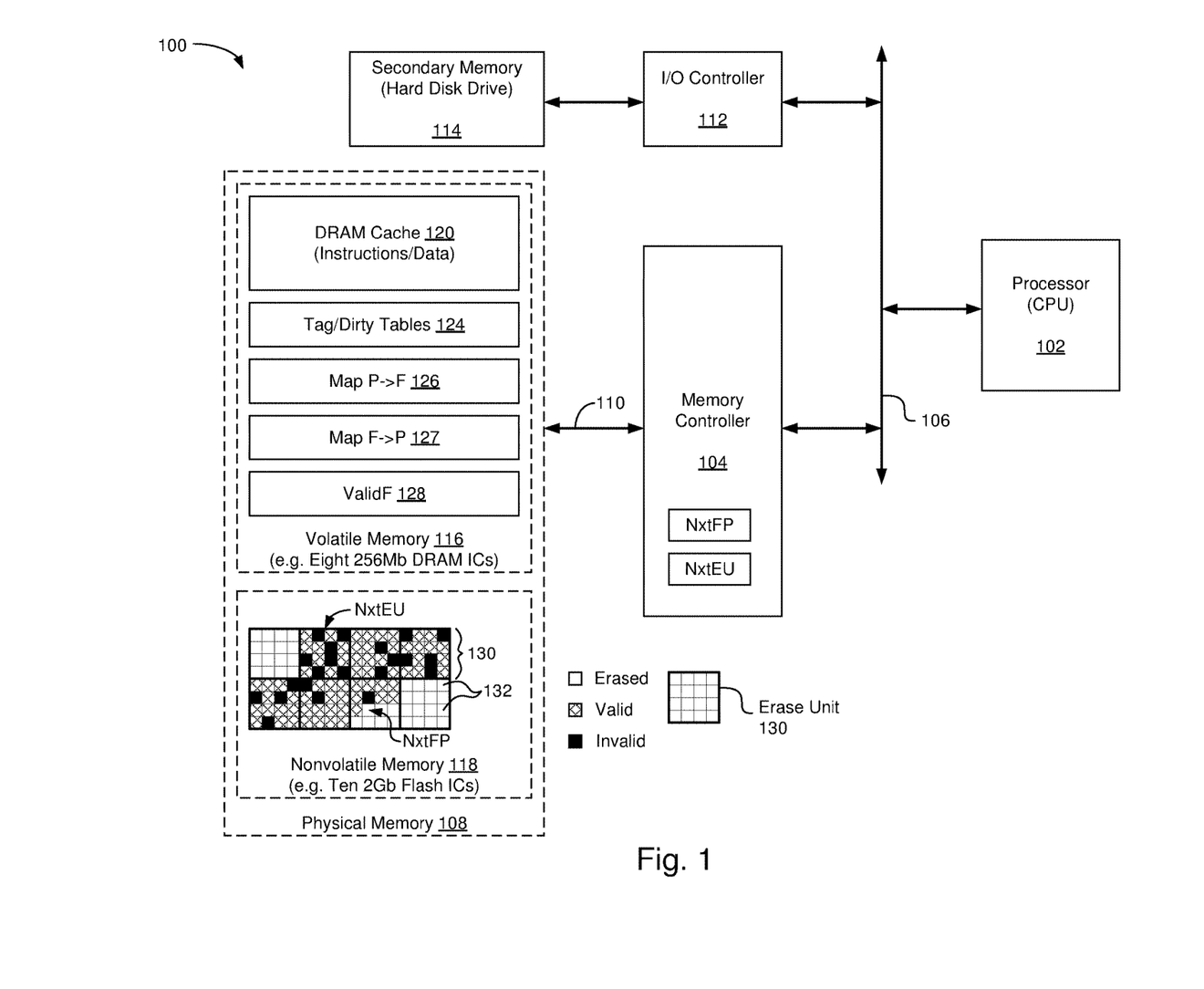
FIG. 1 depicts a portion of a computer system 100 that employs nonvolatile physical memory in accordance with one embodiment.

FIG. 1 depicts a portion of a computer system 100 that employs nonvolatile physical memory in accordance with one embodiment. Computer system 100 includes a processor or central processing unit (CPU) 102 connected to a memory controller 104 via a system bus 106. Memory controller 104 acts as a bridge between CPU 102 and some physical memory 108. Other terms are often used in the computer industry to describe this type of bridge device, including "north bridge" or "memory controller hub." Memory controllers are often sold as part of a set of devices, commonly referred to as the system "chip set," though memory control functions can also be supported with other functions on a common integrated circuit (IC) device, including the CPU itself, and/or can be distributed among a number of devices.

Memory controller 104 is connected to a physical memory 108 via a communication channel 110 and to an IO controller 112 via system bus 106, though the memory and IO controllers may connect to different buses in other embodiments. IO controller 112 interfaces to peripheral devices, including e.g. a hard disk drive 114. Disk drive 114 serves as secondary storage in the present example. System bus 106 and channel 110 may include one or more signal lines, such as, for example signal lines to carry address, data, control, strobe, or clock signals. These details are readily understood by those of skill in the art and are omitted here for brevity.

Memory controller 104 may translate physical addresses P from CPU 102 to an addressing scheme suitable for physical memory 108. Such translation allows memory controller 104 to support different physical-memory configurations. In the instant example, however, physical addresses P from CPU 102 are assumed to be suitable for use with physical memory 108 without translation. Memory controller 104 additionally includes a pair of registers NxtFP and NxtEU, the purposes of which are detailed below.

Physical memory 108 includes volatile and nonvolatile portions 116 and 118, DRAM and flash memory in this embodiment. Volatile and nonvolatile portions 116 and 118 each store data in terms of "access units," which may be defined as the smallest memory areas handled as a single chunk of data. In the instant example, volatile memory 116 supports volatile access units that store two-kilobyte pages, and nonvolatile memory 118 supports nonvolatile access units that store pages of the same size. The volatile and nonvolatile access units may be sized differently in other embodiments.

Reads and writes to nonvolatile memory 118 may be performed one access unit at a time, in a random-access fashion, but erasures are carried out on collections of access units. Flash memory 118 is therefore divided into erase units 130, sometimes called "erase blocks," each of which is divided into nonvolatile access units 132. Each nonvolatile access unit 132 within an erased erase unit 130 can be written to or read from. Once written to, however, a nonvolatile access unit 132 cannot be written to again until the entire erase unit 130 is erased.

DRAM 116, at the direction of memory controller 104, provides a cache 120 for instructions and data and tag and dirty tables 124. CPU 102 employs tables 124 to keep track of which virtual pages reside in physical memory 108 and whether those pages have been written to without the changes having yet been saved to a lower level in the memory hierarchy (i.e., are dirty). Virtual-to-physical and physical-to-virtual address translation tables (not shown) may be held in secondary memory and may be moved to physical memory by paging software (also not shown) executing on CPU 102. These and other details that relate to the use of virtual memory are well understood by those of skill in the art and are therefore omitted for brevity.

Controller 104 tracks dirty pages in DRAM 116, which are those pages that include changes not reflected in corresponding memory locations within flash memory 118. In accordance with the depicted embodiment, controller 104 also uses DRAM 116 to store maps 126 and 127 of physical-to-flash (P→F) and flash-to-physical (F→P) address translations identifying where data and instructions in cache 120 have corresponding pages in flash memory 118 and vice versa, and to store a valid table 128 identifying which pages in flash memory 118 include valid data. Flash memory 118 will typically include considerably more address locations than will DRAM 116. For example, volatile portion 116 may include eight 256 Mb DRAM ICs and nonvolatile portion 118 may include ten 2 Gb flash memory ICs in one embodiment.

In the example of FIG. 1, CPU 102 accesses (reads or writes) cache lines of e.g. sixty-four bytes from DRAM 116 via controller 104. Memory controller 104 fills volatile memory 116 in volatile access units (e.g. DRAM pages) and fills nonvolatile memory 118 in nonvolatile access units (e.g. Flash pages) of the same size as the volatile access units. With reference to the key in the lower center of FIG. 1, access units 132 can be erased or can contain information that is either valid or invalid. These distinctions are described below.

Figure 2:
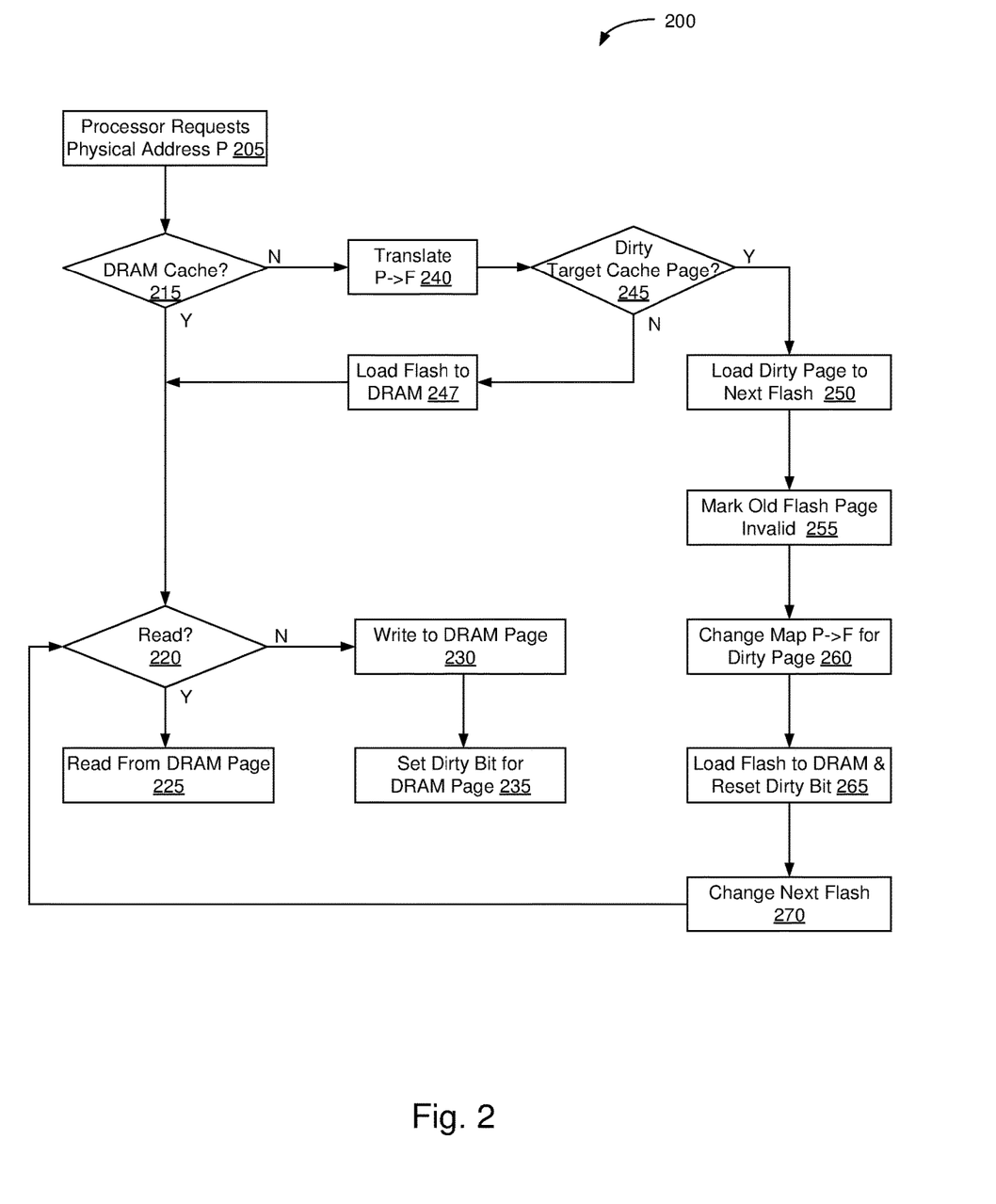
FIG. 2 is a flowchart 200 depicting the operation of computer system 100 of FIG. 1 in accordance with one embodiment.

FIG. 2 is a flowchart 200 depicting the operation of portions of computer system 100 of FIG. 1 in accordance with one embodiment. The process begins when CPU 102 presents a physical cache line address to memory controller 104 as part of the process of requesting access to a page (step 205). Memory controller 104 determines whether the requested page is in DRAM cache 120 (decision 215). If so, and if the access request is to read data (decision 220), then memory controller 104 reads the requested line from cache 120 and presents the resulting information to CPU 102 via system bus 106 (step 225). If the information is in cache 120 and the access request is to write data, then memory controller 104 writes data from CPU 102 into the addressed line of cache 120 (step 230) and sets the dirty bit associated with the written page address in cache 120 (step 235). The dirty bit marks the fact that the page in cache 120 has been changed, and so cannot be flushed from cache 120 or overwritten unless the modified page is copied to a lower level in the memory hierarchy. Decision 215 relies upon entries in tables 124 that indicate which pages, by physical page address, reside in cache 120.

Returning to decision 215, if the requested page is not in cache 120, then memory controller 104 copies the requested page from flash memory 118 into cache 120 in preparation for the requested memory access. To do this, memory controller 104, using the contents of map 126, translates the requested physical address P into the corresponding flash address F (step 240). Before copying the selected flash page into the DRAM cache, memory controller 104 determines whether the page to be overwritten in cache 120 (the target page) represents a "dirty" page by referencing tables 124 in DRAM 116 that memory controller 104 maintains for this purpose.

If that target page is not dirty, per decision 245, then the contents of the requested page is loaded from flash memory 118 into the clean page in cache 120 (step 247). If the target page is dirty, however, before loading the requested page from flash memory 118 to cache 120, memory controller 104 copies the target page to flash memory 118 to retain whatever changes were made to the target page since the target page was loaded from flash memory 118. Memory controller 104 (1) loads the dirty target page from cache 120 into an address in flash memory 118 identified as the next flash page by register NxtFP (step 250), (2) marks the prior flash address associated with the dirty page as invalid in table 128 (step 255), and (3) changes the physical-to-flash mapping associated with the dirty page so that subsequent requests for the newly saved page will access the updated flash page (step 260). With the contents of the target page in cache 120 thus preserved, the contents of the requested page is loaded from flash memory 118 into the formerly dirty page in cache 120 and the corresponding dirty bit in table 124 is reset (step 265). The next-flash page address NxtFP is then changed to point to an erased page 132 in flash memory 118 in preparation for the next write to flash memory (step 270). The process then returns to decision 220 for completion of the memory access.

Some embodiments favor overwrites to clean pages over dirty ones to reduce the overhead and lifespan reduction associated with a write. Using a multi-set DRAM cache, for example, the selection of a page to overwrite could factor in the clean or dirty state of the target page. The process might also take other factors into account when selecting a target page. Some embodiments, for example, favor writes to the least-recently used clean location.

The number of flash pages (e.g., access units 132 of FIG. 1) marked as invalid will increase over time. A garbage collection process may therefore be performed from time to time to recover invalid pages for subsequent use. In one embodiment, register NxtEU may be implemented as a simple counter that identifies the address of the next one of erase blocks 130. When the number of erased memory pages drops below a threshold, for example, memory controller 104 may copy each of the valid pages in the next erase block into available erased flash pages before erasing the erase block and changing the contents of register NxtEB to point to the next candidate for an erase operation. In some embodiments memory controller 104 maintains a table in physical memory 108 that keeps track of the number of invalid pages in each erase block 130. When the number of erased pages falls below some threshold, an erase block with many or the most invalid pages may be erased.

Figure 3:
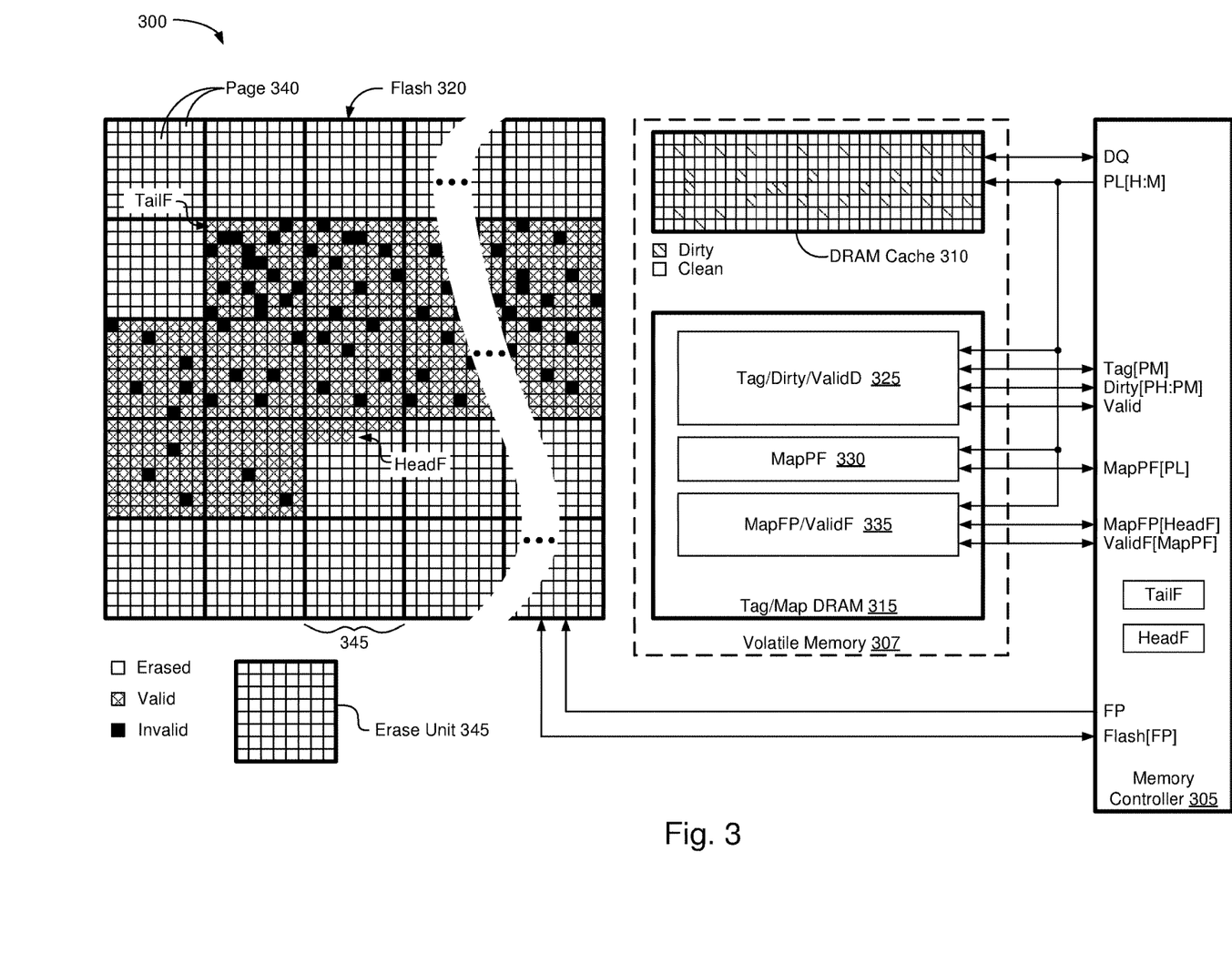
FIG. 3 depicts a memory system 300 in accordance with another embodiment, including a memory controller 305, a DRAM cache 310 for instructions and data, DRAM tag and map tables 315, and flash memory 320.

FIG. 3 depicts a memory system 300 in accordance with another embodiment, including a memory controller 305, volatile DRAM memory 307, and nonvolatile flash memory 320. Flash memory 320 is divided up into groups of nonvolatile access units (pages) 340 and erase units 345. Volatile memory 307 includes a DRAM cache 310 and DRAM tag and map tables 315. Cache 310 stored instructions and data for the CPU (not shown), and may be similar to cache 120 of FIG. 1. Tag and map tables 315, in this embodiment, includes:

1. a tag/dirty/valid table 325 that identifies which physical address locations in cache 310 include pages of valid information, and which of those represents dirty pages;
2. a mapPF table 330 that memory controller 305 may use to maintain a mapping between physical addresses and flash addresses for pages 340; and
3. a MapFP/ValidF table 335 that memory controller 305 may use to maintain a mapping between flash addresses and physical addresses and to identify valid and invalid page entries in flash memory 320.

Memory controller 305 includes two registers that keep track of the amount of available erased pages in flash memory 320: a head register HeadF contains the address of the next empty one of flash pages 340 to receive data writes, and a tail register TailF contains the address of the one of erase units 345 storing the eldest data. The erase unit with the eldest data is likely to be among the erase units with the highest number of invalid page entries. Erasing the erase unit with the eldest data is therefore likely to free up a relatively large number of nonvolatile access units for future writes. Memory controller 305 communicates with the other components of memory system 300 over a number of ports, descriptions of some of those ports are provided below in connection with FIGS. 4-6.

Figure 4:
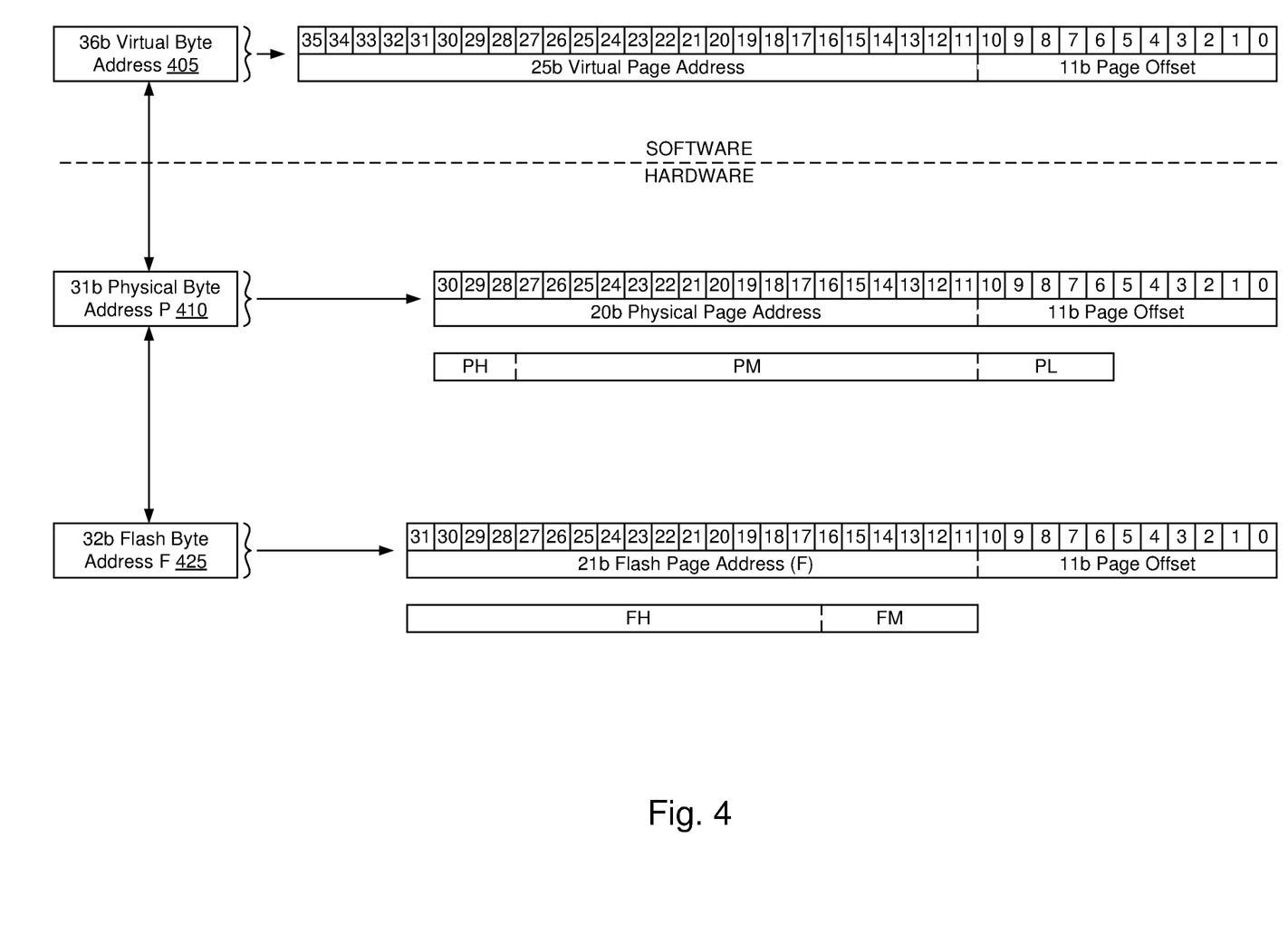
FIG. 4 depicts an addressing scheme that may be used in an embodiment of memory system 300 of FIG. 3.
Figure 5:
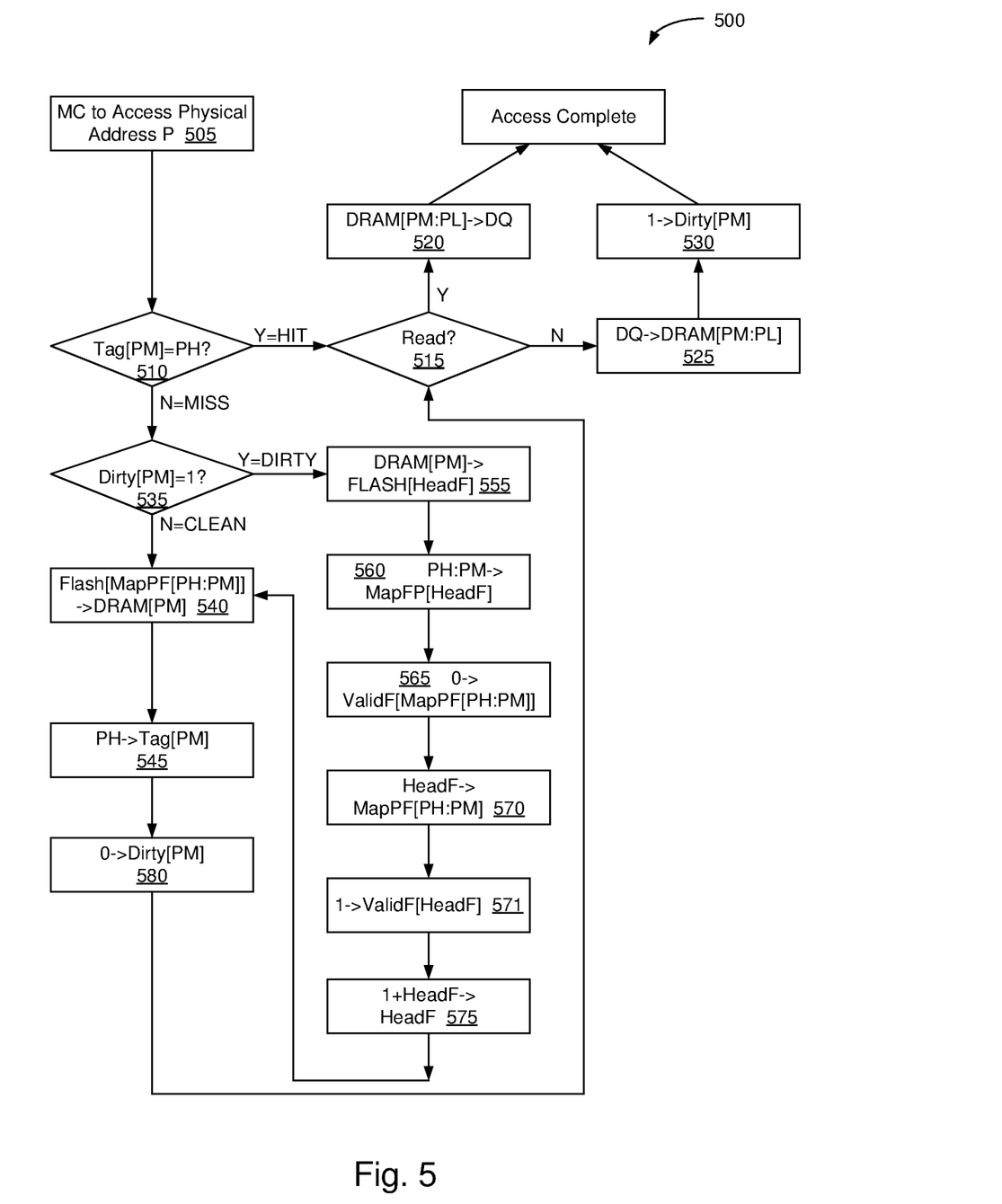
FIG. 5 is a flowchart 500 depicting the operation of the embodiment of memory system 300 of FIG. 3 in terms of the addressing scheme of FIG. 4.

FIG. 4 depicts an addressing scheme that may be used in an embodiment of memory system 300 of FIG. 3. FIG. 5 is a flowchart 500 depicting the operation of that embodiment in terms of the addressing scheme of FIG. 4. On the software side of FIG. 4, the CPU expresses 36 b (thirty-six bit) virtual byte addresses 405, each including a 25 b page address and an 11 b page offset. The CPU converts virtual byte addresses 405 to 31 b physical byte addresses 410 using address translation tables maintained in a translation look-aside buffer (TLB) translation table (not shown) within the CPU. The TLB is a type of cache that holds copies of the virtual-to-physical translations for the most recently used pages. The specified numbers of bits for the various fields are exemplary and not limiting, as will be readily understood by those of skill in the art.

In the example of FIG. 4, each physical byte address P 410 includes a 20 b physical page address and an 11 b page offset. The page address is divided into a 3 b field PH and a 17 b field PM. The page offset contains a 5 b field PL for specifying a 64 byte line in the page. In this example, it is assumed that a read or write memory access transfers a 64 byte line. The CPU and translation table are omitted from FIG. 3, but examples are discussed above in connection with FIG. 1.

In one embodiment, the twenty-five most significant bits of physical byte address P 410 represent a physical line address (PH:PM:PL), which may be logically divided into the three most-significant bits PH, the middle seventeen bits PM, and the least-significant five bits PL. The tag portion of tables 325 includes columns of three-bit tags (aligned to the PH field) each associated with a 17-bit physical tag address (aligned to the PM field). Flash byte addresses 425 are expressed as a 21 b flash page address and an 11 b page offset. The flash page address is divided into a 15 b field FH and a 5 b field FM.

Flowchart 500 of FIG. 5 outlines how memory controller 305 of FIG. 3 may perform read and write accesses for pages located in physical memory. As in the prior example of FIG. 1, the physical memory in system 300 of FIG. 3 includes DRAM and flash memory. The process of FIG. 5 commences when memory controller 305 attempts to access a physical memory location specified by a physical byte address P 410 (step 505). At decision 510, memory controller 305 examines the contents of tables 325 to determine whether the requested address is in DRAM cache 310. To do this, memory controller 305 accesses the tag memory at the address location identified by the middle bits PM of physical byte address 410. A match between the three most significant bits PH of physical byte address 410 and the three-bit tag of the selected tag address in tag memory indicates a cache hit.

In the case of a cache hit, memory controller 305 either reads from or writes to the location in DRAM cache 310 identified by the mid- and low-order bit fields PM:PL of physical byte address 410 (decision 515). For a read, memory controller 305 causes DRAM cache 310 to present the contents of the addressed cache line on data signals DQ (step 520) and sends the read data to the CPU. For a write, memory controller 305 causes DRAM cache 310 to accept data provided from the CPU onto data signals DQ into the addressed cache line (step 525). Memory controller 305 then alters the contents of tables 325 to mark the altered page in cache 310 as dirty (step 530).

In the case of a cache miss, memory controller 305 will move the requested page from flash memory 320 into an address location in DRAM cache 310. This "target" address location in cache 310 will typically be the least-recently used (accessed) page. Memory controller 305 considers tables 325 to determine whether the target page is dirty (decision 535). If the target page is clean, an identical copy of the target page resides in flash memory 345; if dirty, then the corresponding copy in flash memory 345 is stale, so the dirty page is written to flash memory 345 to preserve the information in the target page.

If controller 305 determines that the target page is dirty, then the target page at DRAM cache address PM is loaded into flash memory 345 at the address of the erased page specified by register HeadF (step 555). Table 330 is then updated to reflect the new physical-to-flash mapping between the target page in cache 310 and the flash-head address HeadF (step 560) using the PH:PM fields of the physical address. The flash page address formerly associated with the target page in cache 310 is marked invalid in tables 335 (step 565) using the PH:PM fields of the physical address. The flash head page address HeadF is loaded into table 330 to update the flash-to-physical mapping for the target page (step 570) using the PH//PM fields of the physical address, and address HeadF is marked as valid (step 571). Controller 305 then increments head address HeadF (step 575). The process then moves to step 540.

For clean target pages, memory controller 305, using physical-to-flash mapping tables 330, converts the requested physical page address PH:PM into a flash page address FH:FM and loads the contents of that flash page into the target page location PM in cache 310 (step 540). The tag location at PM is loaded with the upper physical address field PH (step 545), and the dirty location at PM is cleared to zero (step 580). The process then moves to decision 515 and the requested memory access, either a read or a write, is completed.

The process of flowchart 500 is repeated for each access to physical memory. Each cache miss to a dirty page produces an invalid page 340 in a page in flash memory 345. If allowed to accumulate, the invalid page entries would prevent memory controller 305 from writing new pages into flash memory 320. Memory controller 305 therefore supports a garbage-collection process that recycles invalid pages.

Figure 6:
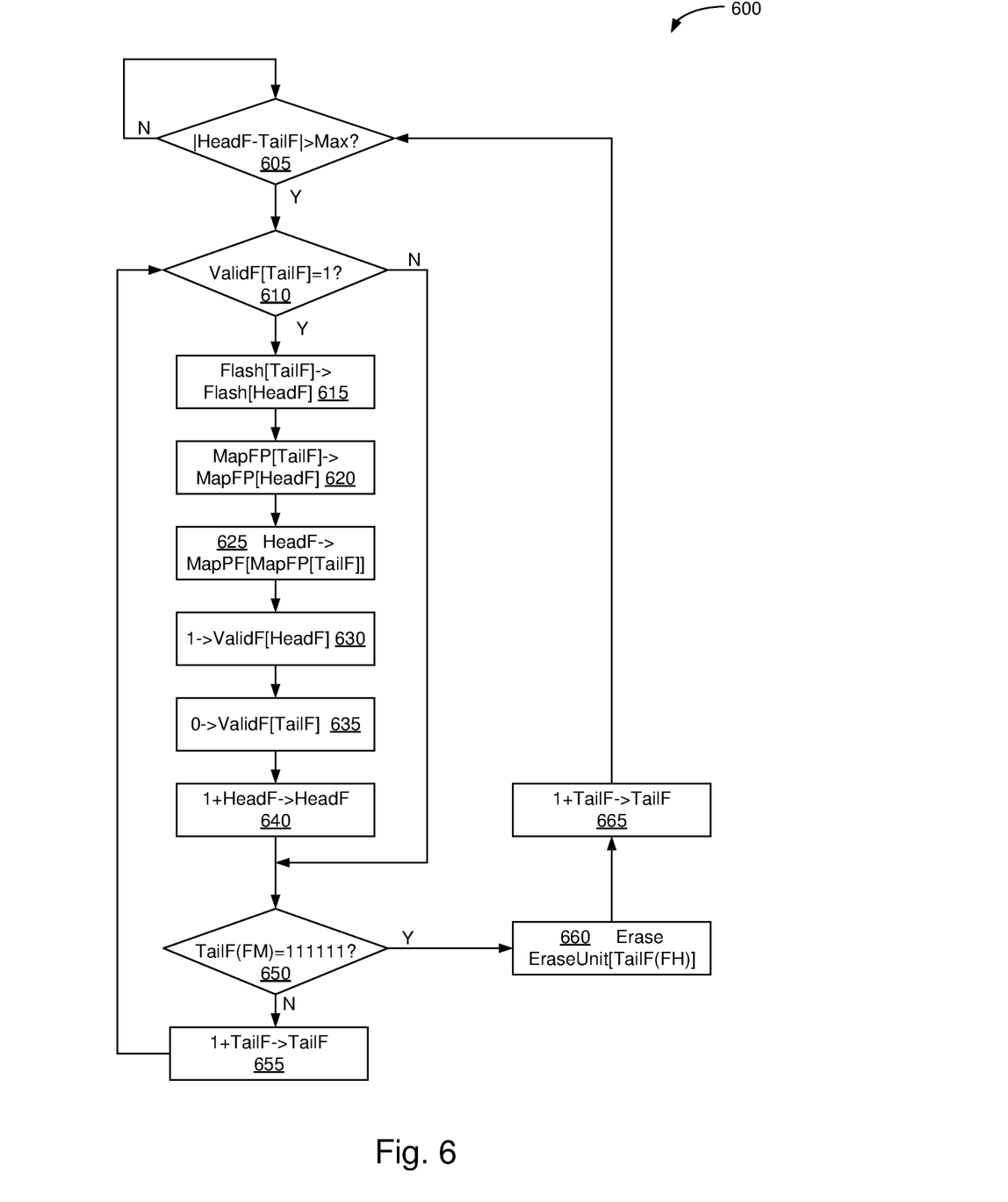
FIG. 6 is a flowchart 600 illustrating a garbage-collection process implemented by controller 305 of FIG. 3 in one embodiment.

FIG. 6 is a flowchart 600 illustrating a garbage-collection process which may be implemented by controller 305 of FIG. 3 in one embodiment. If the difference between the head address HeadF and the tail address TailF exceeds some threshold, indicating that flash memory 345 is running low on erased pages, controller 305 begins a garbage collection process (decision 605). Controller 305 then checks tables 335 to determine whether the current tail page contains valid data (decision 610).

If the tail page contains valid information, the contents of flash memory 345 at address TailF is loaded into address HeadF (step 615) and the flash-to-physical and physical-to-flash mappings in tables 335 and 330 are updated accordingly (steps 620 and 625). Controller 305 then accesses tables 335 to set the valid bit associated with the head address (step 630) and to reset the valid bit associated with the tail address (step 635). The head pointer is then updated by incrementing register HeadF (step 640). Per decision 650, if bits of field FM of TailF are all logic ones, then the tail address corresponds to the last page entry in the selected erase unit. If so, then the erase unit specified by address TailF is erased (step 660), the tail pointer is incremented to the first page address in the next erase block (step 665), and the process returns to decision 605. If bits of field FM are not all logic ones, then the tail pointer is incremented (step 655) and the process returns to decision 610. There is no reason to save the contents of invalid flash pages, so memory controller skips from decision 610 to decision 650 when it encounters an invalid page.

The embodiment of FIG. 3 uses a single data structure comprised of a contiguous group of valid and invalid page entries snaking through flash memory 345 to distribute write operations relatively evenly across the flash memory, and to consequently prolong the service life of the flash memory 320. The concept of distributing writes across nonvolatile media is known as "wear leveling," and has been applied to hard drives and solid-state disks that employ flash memory. The system of FIG. 3 differs from previous applications in that the remapping of physical to flash addresses is being performed across two of more flash devices by an external controller, and the mapping is a completely arbitrary one (any physical address may be mapped to any flash address without limit). This permits every flash address to be written and erased an equal number of times, maximizing the endurance of the whole flash system.

Some embodiments can use more than one data structure and/or different kinds of structures. For example, two data structures can work their way through flash memory simultaneously, one for read-only or read-mostly pages and the other for write-often pages. The write-often data structure would be smaller and faster moving, and could jump through and around the other data structure.

In the above-described examples the access units in physical memory are of the same size as the pages addressed by the CPUs. In other embodiments the life of the nonvolatile memory can be extended by reducing the size of the access units relative to the pages addressed by the CPU. The use of relatively smaller nonvolatile access units reduces the speed at which erase units are filled, and consequently reduces the frequency of erase operations. The tables employed to map requested physical addresses to the relatively small nonvolatile access units would be more complex than in the foregoing embodiments, but the operation of such a memory system would be conceptually similar. The resulting larger tables could be stored in flash memory and cached in DRAM. Increasing the amount of flash memory for implementing a given quantity of physical memory similarly extends the life expectancy of the flash memory.

In some embodiments the memory controller can support error detection and correction for memory reads. In detecting errors, such embodiments can identify defective flash pages and substitute defective flash pages with spare pages reserved for this purpose. A table distinguishing good and bad flash pages can be maintained in e.g. flash memory for this purpose.

Flash memory devices are rated based upon a number of performance criteria, including read, write, and erase times, a maximum number of write cycles (endurance count), and the minimum time the memory can be expected to retain stored data (retention time). Flash memory used in the foregoing embodiments might be adapted to favor access times and/or write-cycle endurance over data retention. Depending upon the optimization, the flash memory might require periodic refreshing (e.g., each flash access unit is written to at least once a month), a process that could be supported by the flash device or in an associated memory controller.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example:

The examples provided above employ a direct-map DRAM cache, but other embodiments can employ different cache management schemes (e.g., an N-way associative cache management scheme) for improved performance.

The volatile memory can be implemented using technologies other than DRAM.

The nonvolatile memory can be implemented using technologies other than flash memory. In general, the memory access methods and circuits are particularly important for memory systems with nonvolatile physical memory that suffers a wear mechanism asymmetrically associated with write operations but may be employed in other systems as well.

The memory controller, two or more of the RAM, the CPU, the memory, and a graphics controller can be instantiated together on the same integrated circuit device or on various combinations of devices.

The flowcharts described above are intended to convey an operational sense of some embodiments; in practice, the process flow need not proceed as specified. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory system comprising:
   a nonvolatile memory having a plurality of nonvolatile access units each specified by a respective nonvolatile-access-unit address;
   a volatile memory having a plurality of volatile access units, each volatile access unit specified by a respective volatile-access-unit address; and
   a memory controller coupled to the nonvolatile memory and the volatile memory, the memory controller including:
      a head register to store, as a head nonvolatile address, the nonvolatile-access-unit address of a next one of the nonvolatile access units to receive next data; and
      a tail register to store, as a tail nonvolatile address, the nonvolatile-access-unit address of old data written to the nonvolatile memory before the next data, wherein the head nonvolatile address and the tail nonvolatile address define between them a sequence of nonvolatile addresses;
      wherein the memory controller compares the head and tail nonvolatile addresses to initiate a garbage-collection process that moves the old data into the nonvolatile-access-unit address of the next one of the nonvolatile access units.

2. The memory system of claim 1, wherein the memory controller moves second data from a volatile access unit into the next one of the nonvolatile access units responsive to a write command.

3. The memory system of claim 2, wherein the memory controller increments the head nonvolatile address after each write to one of the nonvolatile access units.

4. The memory controller of claim 1, the memory controller to maintain a first address translation table mapping the volatile-access-unit addresses to the nonvolatile-access-unit addresses, and a second address translation table mapping the nonvolatile-access-unit addresses to the volatile-access-unit addresses.

5. The memory system of claim 1, the memory system to store table entries that identify ones of the nonvolatile access units that include valid data and others of the nonvolatile access units that include invalid data.

6. The memory system of claim 1, the memory system to change the next nonvolatile address for every write to one of the nonvolatile access units to evenly distribute the writes.

7. The memory system of claim 6, the memory system to increment or decrement the next volatile-access-unit address for every write.

8. A memory-access method for a memory system with physical memory that includes a plurality of volatile storage locations addressed by a corresponding plurality of volatile-storage addresses and a plurality of nonvolatile storage locations addressed by a corresponding plurality of nonvolatile-storage addresses, the method comprising:
   maintaining a head pointer designating a head address of the nonvolatile-storage addresses, the head address corresponding to the nonvolatile storage location to receive next write data;
   maintaining a tail pointer designating a tail address of the nonvolatile-storage addresses, wherein the head address and the tail address define between them a sequence of the nonvolatile-storage addresses;

writing a first information unit to the head address;

advancing the head pointer to a second head address responsive to the writing of the information unit; and comparing the advanced head pointer to the tail pointer and, if a difference between the head pointer and the tail pointer exceeds a threshold, reading a second information unit from one of the nonvolatile storage locations and writing the second information unit to the head address designated by the advanced head pointer.

9. The memory-access method of claim 8, wherein the tail address corresponds to an eldest of the information units stored in the nonvolatile storage locations.

10. The memory-access method of claim 8, further comprising advancing the tail pointer to exclude from the sequence of the nonvolatile-storage addresses the address of the nonvolatile storage location from which the second information unit was read.

11. The memory-access method of claim 10, further comprising erasing the nonvolatile storage location from which the second information unit was read.

12. The memory-access method of claim 11, further wherein erasing the nonvolatile storage location from which the second information unit was read including erasing a block of nonvolatile storage locations.

13. The memory-access method of claim 12, wherein the block is an erase block.

14. The memory-access method of claim 8, wherein the sequence of the nonvolatile-storage addresses are contiguous.

15. The memory-access method of claim 8, further comprising maintaining a first map from ones of the volatile-storage addresses to ones of the nonvolatile-storage addresses and a second map from ones of the nonvolatile-storage addresses to ones of the volatile-storage addresses.

16. A computer-readable medium having stored thereon a data structure having information defining at least a portion of an integrated-circuit memory controller, the data structure comprising:

first data representing a first connection to couple to a cache memory of volatile access units;

second data representing a second connection to couple to a nonvolatile memory with nonvolatile access units specified by respective nonvolatile-access-unit addresses;

third data representing a head register to store, as a head nonvolatile address, the nonvolatile-access-unit address of a next nonvolatile access unit to receive write data from one of the volatile access units;

fourth data representing a tail register to store, as a tail nonvolatile address, the nonvolatile-access-unit address storing an eldest of the data, the head and tail nonvolatile addresses to define between them a contiguous group of consecutive nonvolatile addresses; and fifth data representing circuitry to compare the head and tail nonvolatile addresses to initiate a garbage-collection process.

17. The computer-readable medium of claim 16, wherein the nonvolatile-access-unit addresses each reference a page.

18. The computer-readable medium of claim 16, further comprising sixth data representing third connection to couple to a system bus.

19. The computer-readable medium of claim 18, the memory controller to communicate instructions and data via the first connection and the second connection.

20. The computer-readable medium of claim 16, further comprising sixth data representing circuitry to maintain an address translation table mapping addresses of the volatile access units to the nonvolatile-access-unit addresses.

* * * * *